United States Patent [19]

Oguino

[11] 4,412,253

[45] Oct. 25, 1983

[54] AUTOMATIC NOISE REMOVAL DEVICE FOR A PICTURE SIGNAL

[75] Inventor: Masanori Oguino, Yokohama, Japan

[73] Assignee: Hatachi, Ltd., Tokyo, Japan

[21] Appl. No.: 307,583

[22] Filed: Oct. 1, 1981

[30] Foreign Application Priority Data

Oct. 4, 1980 [JP] Japan ................................ 55-138245

[51] Int. Cl.³ .............................................. H04N 5/21
[52] U.S. Cl. ................................................... 358/167
[58] Field of Search ................................ 358/167, 36

[56] References Cited

U.S. PATENT DOCUMENTS 4,031,547  6/1977  Saiki et al. ........................ 358/167

FOREIGN PATENT DOCUMENTS 52-24029  2/1977  Japan ................................... 358/167

Primary Examiner—John C. Martin
Attorney, Agent, or Firm—Antonelli, Terry & Wands

[57] ABSTRACT

Disclosed is an automatic noise removal device which detects an amplitude of noise contained in a high frequency component of a picture signal during a flyback period of the picture signal, produces a threshold level depending on the detected signal, and removes from a video signal a high frequency component of the picture signal contained in a picture signal at a lower level than the threshold level.

10 Claims, 1 Drawing Figure

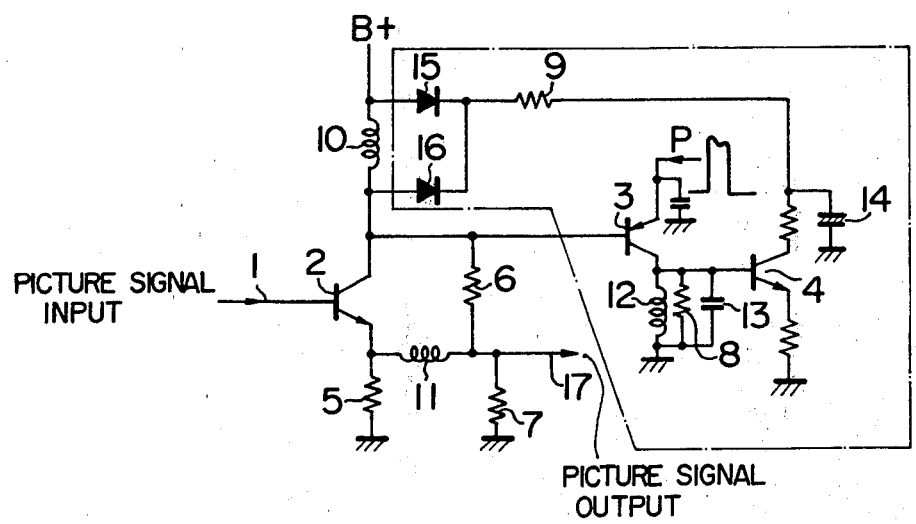

AUTOMATIC NOISE REMOVAL DEVICE FOR A PICTURE SIGNAL

BACKGROUND OF THE INVENTION

The present invention relates to an automatic noise removal device for removal of high frequency components from a picture signal only when the S/N ratio is bad in a television receiver.

A noise component contained in a television signal generally exists in high frequencies of the television signal. Therefore, a mere removal of the noise may be attained by attenuating the high frequencies of the television signal.

The attenuation of the high frequencies, however, brings about a loss of the information representing the contour of the picture being reproduced. Therefore, the resolution of the reproduced picture is deteriorated, resulting in a significant reduction in the picture quality. For this reason, it is required that the high frequencies with higher amplitudes than that of the noise be left in the picture signal to the extent possible.

A technique to satisfy this requirement is disclosed in U.S. Pat. No. 4,031,547. The prior art technique adjusts the amount of attenuation of the high frequencies in accordance with the level of the picture signal, thereby to successfully remove only the noise with relatively small deterioration of the resolution. In a picture reproduced by a television receiver, a deterioration of the resolution in a dark portion of the reproduced picture contributes little to a deterioration of the picture quality, but this portion of the picture is greatly influenced by noise. Based on this fact, when the picture is dark, that is, when the level of the picture signal is lower as seen from a black level, the high frequencies are attenuated relatively greatly. When the picture becomes bright, that is, when the level of the picture signal becomes high, the high frequencies are transmitted and not attenuated. In this way, only the noise component may be effectively removed while deteriorating the picture quality only to a relatively small degree.

According to this method, however, the high frequency component is always lost in the dark portion. Therefore, even in a noise-free condition with a good S/N ratio, the resolution must always be reduced in some degree.

SUMMARY OF THE INVENTION

Accordingly, an object of the present invention is to provide an automatic noise removal device for a video signal which ensures an effective gain of the high frequency component in a good S/N condition so as to have a satisfactory resolution even in a dark picture, but which operates so as to reproduce a picture with undistinguishable noise in a poor S/N condition.

In accordance with the present invention, a high frequency noise component of a television picture signal is detected during a retrace period. The threshold level used for removal of the high frequency component in a noise removal circuit is controlled in accordance with the amplitude of the detected signal so that a high frequency noise component which is smaller than a certain amplitude does not appear in the picture.

BRIEF DESCRIPTION OF THE DRAWING

The single FIGURE is a circuit diagram of an embodiment of an automatic noise removal device for a video signal according to the present invention.

DESCRIPTION OF THE PREFERRED EMBODIMENT

An embodiment of an automatic noise removal device for a picture signal according to the present invention will be described with reference to the accompanying drawing. In the FIGURE, reference numeral 1 designates a picture signal input line, 2 to 4 transistors, 5 to 9 resistors, 10 to 12 inductors, 13, 14 capacitors, 15, 16 diodes, and 17 a picture signal output line.

In the circuit, the transistor 2, the resistors 5 to 7 and inductors 10 and 11 make up a well known secondary derivative high frequency compensating circuit which emphasizes the high frequency component of a picture signal supplied from the input line 1 and supplies it to the output line 17, in order to obtain a sharp picture. A frequency characteristic $G(\omega)$ of a transmission system ranging from the input line 1 to the output line 17 in the circuit is represented as follows:

$$G(\omega) = \frac{1 - \frac{j\omega L_{11}}{R_5} \cdot \frac{j\omega L_{10}}{R_6}}{1 + j\omega L_{11}\left(\frac{1}{R_6} + \frac{1}{R_7}\right) + \left(\frac{j\omega L_{11}}{R_7} \cdot \frac{j\omega L_{10}}{R_6}\right)}$$

where
$\omega: 2\pi f$
$L_{10}$, $L_{11}$: Inductances of the inductors 10 and 11
$R_5$ to $R_7$: Resistances of the resistors 5 to 7.

Because of the presence of the second term in the numerator of the above equation, the circuit is called a second derivative circuit.

The transistor 2 serves as a common collector type amplifier for the low frequency component of the video signal, while serves as a common emitter type amplifier for the high frequency component thereof. The inductor 11, and the resistors 6 and 7 make up a low pass filter, through which the low frequency component is transmitted to the output line 17 from the emitter of transistor 2. The inductor 10 serves as a low impedance element for the low frequency components. Accordingly, the high frequency component only appears at the collector of transistor 2 to allow the high frequency component to pass through the resistor 6 to the output line 17. A DC voltage source B+ biases the diodes 15 and 16, so that when the diode 15 or 16 is cut off, the second derivative circuit operates as a high frequency emphasis circuit to emphasize the high frequency component of the picture signal for clearly delineating a reproduced image to improve the resolution of the image and applies it to the output line 17.

A circuit enclosed by a one-dot-chain line controls the operation of the high frequency emphasis circuit in accordance with the S/N of the received picture signal. In the circuitry, the transistor 3 is provided for switching, and for this purpose the emitter is supplied with a horizontal sync pulse or a synchronizing signal P to turn on the transistor 3 during a part of or the entire horizontal retrace. The collector of the transistor 3 is connected to a parallel resonance circuit including an inductor 12, a capacitor 13, and a damping resistor 8, to provide a filter circuit responsive mainly to a signal of 1 to 2 MHz.

Accordingly, a signal of approximately 1 to 2 MHz will appear at the collector of the transistor 2 during the horizontal retrace period of the picture signal, when this signal appears at the collector of the transistor 3. Since the high frequency component of 1 to 2 MHz appearing during the retrace period can be considered as only a noise component, only the noise component contained in the picture signal supplied to the input line 1 is detected at the collector of the transistor 3, and is supplied to the base of the transistor 4. The nominal picture signal amplitude supplied to the input line 1 is kept substantially constant by an AGC circuit of the conventional type in the receiver. Therefore, the amplitude of the noise appearing at the collector of the transistor 3 is proportional to a reciprocal of the S/N ratio of the video signal, and therefore, can be regarded as a measure thereof. Therefore, a signal relating to the S/N ratio is detected by the transistor 3.

The transistor 4 is provided for noise removal control, and for this purpose amplifies the noise component inputted to the base thereof and filter this signal to smooth it by a combination of the capacitor 14 and the resistor 9 to control the average conduction current flowing through the diodes 15 and 16. Accordingly, during a total period including a picture display interval, the average conduction currents flowing through the diodes 15 and 16 change in direct proportion to the amplitude of the noise appearing at the collector of the transistor 3 during the retrace interval. Those conduction currents are substantially zero in a low noise reception condition, while they increase as the noise level increases.

Since a series circuit including the diodes 15 and 16 is connected in parallel with the inductor 10, when these diodes conduct, the inductor 10 is shorted. At this time, the second derivative term in the equation for $G(\omega)$ becomes zero, so that no high frequency compensation is carried out and the noise appearing at the output line 17 is removed.

As a result, according to the embodiment of the present invention, the average conduction currents of the diodes 15 and 16 are controlled by the S/N ratio of the received picture signal. Accordingly, when the S/N ratio is high, the average conduction currents of the diodes 15 and 16 become substantially zero. The diodes 15 and 16 are left cut off at all levels of the picture signal supplied from the input line 1 under this condition, so that the picture signal of which the high frequency component is emphasized over a range from dark to bright in the image, appears at the output line 17. As the S/N ratio reduces, the average conduction currents flowing through the diodes 15 and 16 increase in amplitude.

More specifically, under a certain S/N condition, the current flowing through the resistor 9 is kept at a substantially fixed DC value and flows substantially equally through the diodes 15 and 16, which forms a diode bias current. Under this condition, when the high frequency component current starts to flow through the collector of the transistor 2, the current of the diode 16 is decreased by the increment of the collector current. When the increment of the current reaches the initial current value of the diode 16, the diode 16 is cut off. Incidentally, the current of the diode 15 is increased by the amount of the decrease of the current of the diode 16, since resistor 9 acts as a constant current source. Until the current signal amplitude of the high frequency component signal appearing at the collector of the transistor 2 reaches the value of the bias current of the diode 16, the diodes 15 and 16 shortcircuit the inductor 10 to stop the high frequency emphasizing operation and permit the noise removal operation to occur. When the current signal level of the high frequency component signal appearing at the collector of the transistor 2 exceeds the bias current, the diode 16 is cut off to release the shortcircuited state of the inductor 10, thereby to once again enable the high frequency emphasizing operation.

It can be seen from the foregoing description that the diodes 15 and 16 form a switching circuit for the high pass filter of which the coil 10 is a part, and this switching circuit is controlled by the control signal supplied thereto from the collector of transistor 4 via the resistor 9. More particularly, when the control signal is low, which occurs for a low noise condition where the S/N ratio is high, the diode 16 will be cut off at a low level of the high frequency component appearing at the collector of the transistor 2, so that the high freguency emphasizing operation will be enabled. On the other hand, when the control signal is high, which occurs for a high nose condition where the S/N ratio is low, the diode 16 will conduct for higher levels of the high frequency component, so that the coil 10 will be shorted and the high frequency emphasizing operation will be prohibited. Thus, the level of applied control current at which the diode 16 is cut off represents a "threshold level" above which the high frequency emphasizing operation occurs.

Therefore, according to the embodiment of the present invention, when the S/N ratio of the picture signal is good, a satisfactory high frequency emphasis is carried out over a range from bright to dark portions of the picture signal, so that a picture image with a high resolution is reproduced. With reduction of the S/N ratio of the input signal, the noise removal operation becomes gradually more active. Therefore, it is possible to reproduce a picture image with little noise, but with high resolution.

For this reason, the automatic noise removal device according to the present invention is very effective for suppressing not only the random noise in receiving a weak electric field signal but also the beat interference by the radio interference, for example.

As described above, according to the present invention, the noise component with small amplitude and the beat interference component are effectively suppressed, while the contour signal with a large amplitude for constituting a major contour portion in a small picture image is emphasized. As a result of sharpness of the picture is never deteriorated.

As described above, since the threshold level for the noise removal is controlled in accordance with the S/N of the received signal, a small noise can effectively be removed without damaging the resolution. Therefore, the present invention provide an automatic noise removal device which successfully overcomes the disadvantages of the prior art and can reproduce a picture image with low noise and with high resolution.

I claim:

1. An automatic noise removal device for a picture signal comprising:

means for removing a high frequency component of a picture signal when the amplitude of said high frequency component is below a threshold level and for emphasizing said high frequency component when the amplitude thereof is not below said threshold level;

noise detecting means for detecting a noise component during part of a retrace interval of said picture signal;

means for controlling said threshold level in accordance with the amplitude of the detected signal from said noise detecting means;

wherein when the detected signal from said noise detecting means is small, said threshold control means makes said threshold level substantially zero, and operation of said high frequency removing means is prevented, and when said detected signal is large, said threshold level becomes large and said high frequency component removal means removes a high frequency component contained in said picture signal when it is below said threshold level.

2. An automatic noise removal device according to claim 1, wherein said noise detecting means includes switching means for transmitting said video signal only during a fraction of a horizontal flyback interval and means for detecting said high frequency component in a signal passed through said switching means.

3. An automatic noise removal device according to claim 2, wherein said high frequency component detecting means in said noise detecting means detects said high frequency component by means of a resonant circuit resonated at 1 to 2 MHz.

4. An automatic noise removal device according to claim 1, wherein said threshold control means includes means which amplifies and smoothes the output signl from said noise detecting means to obtain DC current, and said DC current is used as said threshold level of said high frequency component removing means.

5. A noise reducing circuit for video signals comprising:

an input circuit including an active element having first, second and third electrodes, said first electrode being connected for receiving a video signal including high and low frequency components accompanied with noise;

a high-pass filter connected with said second electrode of said active element for deriving the high frequency components of said video signal and a low-pass filter connected with said third electrode of said active element for deriving the low frequency components of said video signal, said high-pass filter and low-pass filter serving as first and second loads on said active element with respect to said high and low frequency components of the received video signal on said first electrode of said active element, respectively;

noise eliminating means including a voltage source and a switching circuit connected between said voltage source and said high-pass filter, the junction point between said switching circuit and said high-pass filter being connected with said second electrode of said active element, whereby said switching circuit is rendered conductive to make the potential on said second electrode substantially constant when the output of said high-pass filter, derivable on said second electrode of said active element, has an amplitude smaller than a predetermined value and is rendered non-conductive when said output derivable on said second electrode has an amplitude not smaller than said predetermined value;

noise detecting means for detecting the amplitude of a noise component of said video signal during a part of the retrace interval of said video signal;

control means responsive to the output of said noise detecting means for applying to said noise eliminating means a control signal for varying said predetermined value in accordance with the detected amplitude of said noise component; and means for adding the output of said low-pass filter to the output of said high-pass filter under control of said noise eliminating means, thereby reproducing a noise-suppressed video signal.

6. A noise reducing circuit for video signals according to claim 5, in which said high-pass filter includes an inductor, and said switching circuit includes two reverse-blocking diodes connected in series in opposite direction, said series-connected diodes being connected in parallel with said inductor, the junction point between said two diodes being connected to said control means.

7. An automatic noise removal device for a picture signal comprising:

means for removing a high frequency component of a picture signal when the amplitude of said high frequency component is below the amplitude level of an applied control signal and for emphasizing said high frequency component when the amplitude thereof is not below the level of said control signal;

noise detecting means for detecting the amplitude of a noise component of said picture signal during a part of the retrace interval of said picture signal;

control means for generating a control signal having an amplitude level which is variable in accordance with the detected amplitude obtained from said noise detecting means; and means for applying said control signal to said removing means, whereby, when the detected signal from said noise detecting means is small, said control means makes said amplitude level of said applied control signal substantially zero, and said high frequency removing means is prevented from removing the high frequency component in said signal, and when said detected signal from said noise detecting means is large, said certain amplitude level becomes large and said high frequency component removal means removes the high frequency component contained in said picture signal.

8. An automatic noise removal device according to claim 7, wherein said noise detecting means includes switching means for transmitting said video signal during at least a portion of a horizontal retrace interval and means for detecting said high frequency component in a signal passed through said switching means.

9. An automatic noise removal device according to claim 8, wherein said detecting means in said noise detecting means detects said high frequency component by means of a resonance circuit having a resonant frequency of 1 to 2 MHz.

10. An automatic noise removal device according to claim 7, wherein said control means includes means which amplifies, smoothes and filters said detected signal output from said noise detecting means to obtain a DC current which forms said control signal of variable amplitude level.

* * * * *